3,322,633
PHARMACEUTICAL PREPARATIONS
Johan R. A. Simoons, Sao Paulo, Brazil, assignor to N. V. Koninklijke Pharmaceutische Fabrieken v/h Brocades-Stheeman & Pharmacia, Amsterdam, Netherlands
No Drawing. Filed Jan. 11, 1965, Ser. No. 424,844
Claims priority, application Netherlands, Feb. 24, 1961, 261,631
3 Claims. (Cl. 167—82)

This application is a continuation-in-part of a previous application, Ser. No. 174,416, filed Feb. 20, 1962, now abandoned.

This invention relates to novel compositions of matter which are improved pharmaceutical preparations providing for the release of pharmacologically active materials over a controlled period of time, and to the novel process for preparing these compositions.

The successful application of a drug largely depends on its mode of administration. Determining the most suitable form for administration is therefore essential. In many cases the oral route of administration is preferred over the parental one.

In prolonged acting preparations for oral administration, there are numerous factors involved, such as the influence of digestive juices, differences in acidity between stomach and intestine, as well as site of resorption of the drug. Furthermore, the amount of drug to be incorporated per dosage unit so as to arrive at and maintain the desired therapeutic effect while preventing toxic reactions and other undesired side effects resulting from excessive doses must be determined. For this purpose the therapeutic index of the drug and its relevant biological half life should be determined.

There are numerous drugs that naturally exercise some prolonged action on the strength of their chemical and physical properties; however, most therapeutically active compounds need relevant adaptation by artificial means. This may be realized by various means and principles. If the action of a drug after oral administration is to be prolonged, efforts will have to be made to affect its resorption, to the extent that it will gradually continue over a period of several hours.

Prior to this invention, the pharmaceutical preparations have been available which provide for the timed release of pharmacologically active materials over an extended period of time. For example, a prior method for preparing tablets of this kind was coating a core of active ingredients with an agent which is highly resistant to gastric juice, and which gradually disintegrates in the intestines.

For use as coating materials substances selected from the groups consisting of shellac, cellulose-acetate-phthalate, glyceryl mono-, di- and tristearate, wax, and cetylalcohol were employed.

On application of the above-mentioned principle, the coatings frequently failed to disintegrate sufficiently and thereby resulted in poor release. Moreover, tablets provided with gastric juice-resistant coatings sometimes remained in the stomach longer than intended. Periods up to eight hours were found in some cases. During this period the active substance could not be released and consequently was not available for absorption. Another inherent disadvantage of this principle is the fact that the pH of the gastro-intestinal tract of the individual plays an important role. The release pattern in a patient suffering from various disturbances of the gastro-intestinal tract, such as achylia, hyperchylia, stomach and intestinal ulcers, may change considerably depending on the actually existing pH.

Other prior methods of preparing the prolonged release compositions involve the use of ion-exchange resins in which the drug has been chemically bound so that an exchange may be released both in stomach and intestine through the active component against H+ and Na+ ions. One major disadvantage of this principle is that the drug molecule must possess groups which allow binding to an ion exchanger. In the absence of such groups ion exchangers are not feasible. Even if such groups are present in the molecule, the desired result often fails to occur because adequate binding often demands an ion exchanger of such acidic or basic strength that the drug molecule is changed structurally. Further disadvantages are that the release depends on a certain electrolyte concentration in stomach and intestine and that the ion exchangers can bind very important cations, such as potassium ions and remove them from the body.

Yet another method which has found some application is the absorption of the active compound to an absorbent. Tannins and proteins are, inter alia, used for this purpose. Practical results so far cannot be called very satisfactory, because the absorbents retain the active substances too persistently or absorb other substances so as to threaten to disturb certain biological balances.

The preparations of this invention have eliminated the disadvantages over the prior preparations by realizing the fact that the desired effect can only be obtained if the drug is intimately mixed with the various components which are going to form the matrix. The condition for this intimate mixing is that the drug and all other ingredients which form the matrix have about the same particle size.

A considerable advantage of this invention over conventional methods of preparing long-acting preparations is that the intimate mixing of drug and other tablet ingredients provides almost immediate release of a sufficient amount of the active component to guarantee initial therapeutic response, followed by prolonged release for sustained therapy.

According to the present invention, the desired result is attained by bringing the drug for which a prolonged acting form is sought to the desired particle size, then intimately mixing it with an inert, insoluble substance having about the same particle size, while a hydrophobic substance and a binding agent, all having the same particle size, are added. The matrix is then formed with a granulating agent.

According to the present invention substances selected from the group consisting of calcium sulfate·½ $H_2O$, anhydrous calcium phosphate and Florite (a mineral mixture with aluminum oxide as main constituent) are preferred as inert insoluble matter.

Suitable hydrophobic substances are the non-hydrophilic salts of the non-toxic alkaline earth metals, such as calcium or magnesium stearate or palmitate or the corresponding aluminum salts. Also hydrogenized and natural animal and vegetable fats and mineral waxes which are solid at body temperature may be used.

As a binding agent, water-swellable substances selected from the group consisting of methyl and ethyl cellulose, polyvinyl acetate, polyvinyl pyrrolidone, cellulose acetate or prolamines, such as zein, kafirin, hordenine and gliadin, or a mixture of these substances may be used.

As a granulating agent, such liquids as a solution of 3% colophonium in 77% alcohol, a solution of 2% colophonium and 1% polyvinylpyrrolidone in 80% alcohol, a solution of 1% colophonium with 1% polyethyleneglycol in 80% alcohol or 70% alcohol may be used.

The matrix, formed from the materials set forth above, may then be processed to granules by dry-granulating and then, if desired, the resulting granules are compressed to tablets in the customary manner.

Drying of the granulate should preferably be effected at temperatures not exceeding 40° C.; the most feasible range has proved to be between 35 and 40° C. When preparing the granulate, care should be taken that the coarse granulated mass should not be subjected to drying until it has been hardened at room temperature.

Compressing of the granulate will yield a strong tablet from which the drug can only be released by diffusion. As a result of this diffusion principle, influences from gastric and intestinal conditions are very nearly eliminated. Neither the acidity nor the possible presence of electrolytes affects the diffusion rate.

It has further been found that the amount of drug released from the tablet per time unit may be accurately scheduled, in addition to prolonging the release thereof. By mixing the drug with a likewise difusible substance, the amount of drug released becomes a function of the ration drug versus total amount of diffusible substance.

As diffusible substances, such salts as selected from the group consisting of $Na_2HPO_4$, $NaCl$ and organic substances such as glucose may be used.

The tablets prepared according to the invention have such a consistency that not even a twenty-four-hour stay in artificial gastric and intestinal juices will cause their disintegration.

As the matrix substance is left unaffected by the gastric and/or intestinal juices, there is very little chance that the gradually formed pores and ducts, through which the active components are made available for absorption, are blocked, irrespective of the length of the stay in stomach and/or intestine.

The method according to the invention may be applied in the production of long-acting preparations with respect to all drugs requiring this dosage form for medication. Owing to their high degree of independence of gastric and intestinal conditions, the said preparations may be administered in all such cases where prolonged action medication is desirable.

The following examples will further illustrate the invention:

EXAMPLE 1

In making tablets the substances listed below are used in the proportionate amounts as indicated and the amounts referred to are for one tablet.

|  | Mg. |
|---|---|
| Orphenadine | 75 |
| Ethylcellulose | 30 |
| Zein | 80 |
| Calcium stearate | 20 |
| Calcium sulfate·½ $H_2O$ | 145 |

The substances passed through the desired size of screen are thoroughly mixed. A granulate is prepared from this mixture in the usual way by granulating with a sufficient amount of 3% colophonium in 77% alcohol. (For 20,000 tablets about 1200 ml. is used.) The mass is divided into small fragments and pressed through a No. 10 screen, gauze width about 2 mm. and left to harden for twelve to twenty-four hours at room temperature. The granulate is then dried in a drying cabinet at 35–40° C. The granules have a high degree of hardness and are passed through a dry granulator with a No. 20 screen, gauze width about 0.8 mm. and are thoroughly mixed; no further additions are made. They are finally compressed to 350 mg. tablets with normal pressure using punches of 8–9 mm. diameter. If desired, the tablets may be coated in a conventional coating pan, colored and polished.

EXAMPLE 2

Sixteen-hour period

In preparing tablets the substances listed below are used in the proportionate amounts stated and refer to one tablet.

|  | Mg. |
|---|---|
| Orphenadrine citrate | 75 |
| Ethylcellulose | 30 |
| Zein | 80 |
| Calcium stearate | 20 |
| Calcium sulfate·½ $H_2O$ | 145 |

The same process as described in Example 1 is used to obtain the required degree of fineness and mixing. Granulating is done, however, with a sufficient amount of a solution of 3% colophonium in 77% alcohol. For 20,000 tablets about 1,400 ml. of the granulating agent is required. Further processing is analogous to that of Example 1. 350-mg. tablets, 8–9 mm. in diameter, are compressed with normal pressure. Again the tablets may be coated in a conventional coating pan, colored and polished if so desired.

EXAMPLE 3

Eleven-hour period

In preparing tablets the substances listed below are used in the proportionate amounts stated and the amounts refer to one tablet.

|  | Mg. |
|---|---|
| Orphenadrine citrate | 75 |
| Ethylcellulose | 30 |
| Zein | 80 |
| Calcium stearate | 20 |
| Florite | 45 |
| Calcium sulfate·½ $H_2O$ | 100 |

"Florite" is a water-insoluble non-swelling mineral product consisting of a mixture of minerals such as $Al_2O_3$ 70–75%; $Fe_2O_3$ 3–4%; $SiO_2$ 11–12%; $TiO_2$ 3–4%; volatile matter 4–6%, and has a high water absorbing capacity. It is commericially available in the form of very fine granules, which, but for their mesh size, may be added to the other components without further processing. A solution of 3% colophonium in 77% alcohol is used for granulating (approximately 1,800 ml. is used for 20,000 tablets). Processing is completed as in Example 1. 350-mg. tablets are compressed with normal pressure with punches of 8–9 mm. diameter. If desired, they may be provided with a color-coating in a conventional coating pan and polished.

EXAMPLE 4

Ten-hour period

In preparing tablets the substances listed below are used in the proportionate amounts stated and refer to one tablet.

|  | Mg. |
|---|---|
| Orphenadrine citrate | 120 |
| Ethylcellulose | 15 |
| Zein | 40 |
| Calcium stearate | 40 |
| Calcium sulfate·½ $H_2O$ | 160 |

Preparation is in accordance with the procedure described in Example 1. 3% colophonium in 77% alcohol is used for granulating (for 20,000 tablets, approximately 1,500 ml. of granulating agent is required). 375-mg. tablets are compressed with normal pressure. The tablets are 8–9 mm. diameter. If desired, they may be provided with a color-coating and polished in a conventional coating pan.

EXAMPLE 5

Greater than twenty-four hour period (A)

In preparing tablets the substances listed below are used in the proportionate amounts stated and refer to one tablet.

|  | Mg. |
|---|---|
| Physostigmine salicylate | 5 |
| Ethylcellulose | 15 |
| Zein | 40 |
| Calcium stearate | 10 |
| Calcium sulfate·½H₂O | 75 |

The various components are brought to the required degree of fineness and mixed very intimately in a mixing apparatus. A 3% colophonium solution in alcohol 77% is used for granulating (approx. 600 ml. of granulating agent is used for 20,000 tablets). The mass is passed through a No. 20 screen, gauze width 0.8 mm., and allowed to harden for twelve hours at room temperature. It is further dried in drying cabinets at 35–40° C. The hard granulate is passed through a dry granulator with a No. 50 screen, gauze width about 0.3 mm., and again homogenized without further additions; the material is then compressed to 145-mg. tablets, 6–7 mm. in diameter. If required, the tablets may be provided with a color-coating and polished in a conventional coating pan.

(B)

Eighteen-hour period

|  | Mg. |
|---|---|
| Physostigmine salicylate | 5 |
| Sodium phosphate | 15 |
| Ethylcellulose | 15 |
| Zein | 40 |
| Calcium stearate | 10 |
| Calcium sulfate·½H₂O | 60 |

The active component is first mixed thoroughly with the sodium phosphate; the mixture is further processed as indicated in Example 5(A), viz. to granules which are compressed with normal pressure to 145-mg. tablets 6–7 mm. in diameter. The tablets may be provided with a color-coating and polished.

It may be desirable to further accelerate the rate of release. This may be reached by increasing the diffusible additive content, as illustrated by the following example:

(C)

Thirteen-hour period

|  | Mg. |
|---|---|
| Physostigmine salicylate | 5 |
| Sodium phosphate | 30 |
| Ethylcellulose | 15 |
| Zein | 40 |
| Calcium stearate | 10 |
| Calcium sulfate·½H₂O | 60 |

After preparation of the granulate according to Examples 5(A) and 5(B), 160-mg. tablets, 6–7 mm. in diameter, are compressed and if desired, a color-coating may be applied in a conventional coating pan.

EXAMPLE 6

Twelve-hour period

In preparing tablets the substances listed below are used in the proportionate amounts stated and refer to one tablet:

|  | Mg. |
|---|---|
| Ephedrine HCl | 20 |
| Ethylcellulose | 15 |
| Zein | 30 |
| Calcium stearate | 10 |
| Calcium sulfate·½H₂O | 75 |

The method of preparation is analogous to that described in Example 5(A); 150-mg. tablets are compressed and may be provided with a color-coating and polished.

EXAMPLE 7

Nine-hour period

In preparing tablets the substances listed below are used in the proportionate amounts stated and refer to one tablet:

|  | Mg. |
|---|---|
| Ephedrine HCl | 20 |
| Zein | 30 |
| Ethylcellulose | 15 |
| Calcium stearate | 10 |
| Anhydrous calcium phosphate | 75 |

The preparation is similar to that described in Example 5(A); 3% colophonium in 77% alcohol is used for granulation (approx. 600 ml. is used for 20,000 tablets). 150-mg. tablets are prepared from the granulate with punches 6–7 mm. diameter. The tablets may, if desired, be provided with a colored and/or polished sugar coating in a conventional coating pan.

The invention may be further embodied within the scope of the appended claims.

What is claimed is:

1. A process for the preparation of a prolonged acting pharmaceutical composition which comprises the steps of (1) intimately admixing a pharmacologically active material with (a) an inert, insoluble matrix-forming substance selected from the group consisting of $$CaSO_4 \cdot \tfrac{1}{2} H_2O$$

anhydrous calcium phosphate, and a mineral mixture consisting essential of 70–75% $Al_2O_3$, 3–4% $Fe_2O_3$, 11–12% $SiO_2$, 3–4% $TiO_2$ and 4–6% volatile material, and mixtures of $CaSO_4 \cdot \tfrac{1}{2} H_2O$ and said mineral mixture; (b) a hydrophobic substance selected from the group consisting of non-hydrophilic salts of metals selected from the group consisting of alkaline earth metals and aluminum; (c) a binding agent selected from the group consisting of methyl cellulose, ethyl cellulose, polyvinyl acetate, polyvinyl pyrrolidone, cellulose acetate, zein, kafirin, hordenine, gliadin and mixtures thereof, said active material and ingredients (a) to (c) all having substantially the same particle size, (2) wetting said intimate admixture with a granulating agent comprising an alcoholic solution of a member selected from the group consisting of colophonium, a mixture of colophonium and polyvinyl pyrrolidone, and a mixture of colophonium and polyethyleneglycol, whereby a mixture of said inert, insoluble substance is formed having embedded therein the other ingredients, and (3) drying and recovering the matrix so obtained in a pharmaceutically useful form.

2. A prolonged acting pharmaceutical composition consisting essentially of a matrix in which are embedded a pharmacologically active material; a hydrophobic substance selected from the group consisting of non-hydrophilic salts of metals selected from the group consisting of alkaline earth metals and aluminum; a binding agent selected from the group consisting of methyl cellulose, ethyl cellulose, polyvinyl acetate, polyvinyl pyrrolidone, cellulose acetate, cellulose prolamine, zein, kafirin, hordenine, gliadin, and mixtures thereof; said matrix being the hard mass obtained by the interaction of a granulating agent comprising an alcoholic solution of a member selected from the group consisting of colophonium, a mixture of colophonium and polyvinyl pyrrolidone, and a mixture of colophonium and polyethyleneglycol and a substance selected from the group consisting of $$CaSO_4 \cdot \tfrac{1}{2} H_2O$$

anhydrous calcium phosphate, a mineral mixture consisting essentially of 70–75% $Al_2O_3$, 3–4% $Fe_2O_3$, 11–12% $SiO_2$, 3–4% $TiO_2$ and 4–6% volatile material and mixtures of $CaSO_4 \cdot \frac{1}{2}H_2O$ and said mineral mixture.

3. A composition as defined in claim 2 which further contains a diffusable substance selected from the group consisting of $Na_2HPO_4$, NaCl and glucose embedded in said matrix.

References Cited

UNITED STATES PATENTS 3,102,845   9/1963   Fennell _____ 167—82

FOREIGN PATENTS 837,451   6/1960   Great Britain.

OTHER REFERENCES

Martin et al., "Remington's Pharmaceutical Sciences," Mack Pub. Co., Easton, Pa., 13th ed., 1965, p. 564.

Martin, "Remington's Practice of Pharmacy," Mack Pub. Co., Easton, Pa., 11th ed., 1956, pp. 375 and 410.

ALBERT T. MEYERS, *Primary Examiner.*

GEORGE A. MENTIS, *Assistant Examiner.*